United States Patent [19]

Yu et al.

[11] Patent Number: 5,628,862
[45] Date of Patent: May 13, 1997

[54] POLISHING PAD FOR CHEMICAL-MECHANICAL POLISHING OF A SEMICONDUCTOR SUBSTRATE

[75] Inventors: Tat-Kwan Yu; Chris C. Yu, both of Austin, Tex.

[73] Assignee: Motorola, Inc., Schaumburg, Ill.

[21] Appl. No.: 444,172

[22] Filed: May 18, 1995

Related U.S. Application Data

[62] Division of Ser. No. 167,008, Dec. 16, 1993, Pat. No. 5,441,598.

[51] Int. Cl.$^6$ ............................................. H01L 21/461
[52] U.S. Cl. ............................ 156/345; 51/293; 438/693
[58] Field of Search ........................ 117/1; 156/345, 156/645, 653; 437/225; 51/209, 283

[56] References Cited

U.S. PATENT DOCUMENTS

| | | | |
|---|---|---|---|
| 4,435,247 | 3/1984 | Basi | 156/636 |
| 4,613,345 | 9/1986 | Thicke et al. | 51/293 |
| 4,821,461 | 4/1989 | Holmstrand | 51/307 |
| 4,841,680 | 6/1989 | Hoffstein et al. | 51/283 R |
| 4,954,141 | 9/1990 | Takiyama et al. | 51/296 |
| 5,015,266 | 5/1991 | Yamamoto | 51/293 |
| 5,020,283 | 6/1991 | Tuttle | 51/209 |
| 5,036,630 | 8/1991 | Kaanta et al. | 51/283 |
| 5,081,051 | 1/1992 | Mattingly | 437/10 |
| 5,096,464 | 3/1992 | Yamamoto | 51/293 |
| 5,177,908 | 1/1993 | Tuttle | 51/283 |
| 5,216,843 | 6/1993 | Breivogel et al. | 51/131.1 |
| 5,219,462 | 6/1993 | Bruxvoort et al. | 51/293 |
| 5,232,875 | 8/1993 | Tuttle et al. | 437/225 |
| 5,302,233 | 4/1994 | Kim et al. | 156/636 |
| 5,329,734 | 7/1994 | Yu | 51/283 |
| 5,399,234 | 3/1995 | Yu et al. | 156/636 |

FOREIGN PATENT DOCUMENTS

| | | | |
|---|---|---|---|
| 331344 | 9/1989 | European Pat. Off. | B24D 11/00 |
| 379361 | 7/1990 | European Pat. Off. | B24D 13/14 |
| 55-51705 | 12/1980 | Japan | B24B 37/04 |
| 3-213265 | 9/1991 | Japan | B24B 37/04 |

OTHER PUBLICATIONS

Yu, et al.; U.S. application No. 08/077,265; Filed on Jun. 17, 1993.

Yu; U.S. application No. 08/054,167; filed on Apr. 30, 1993.

*Primary Examiner*—R. Bruce Breneman
*Assistant Examiner*—Felisa Garrett
*Attorney, Agent, or Firm*—George R. Meyer

[57] ABSTRACT

A mold is used to form a polishing pad, wherein the surface of the polishing side of the polishing pad is determined by a primary surface of the mold. Features along the polishing side of a polishing pad may take any one of several different shapes. Channels along the polishing side of the polishing pad allow a smaller pore size to be used. The mold allows more control over the surface of the polishing side, which in turn give more control over polishing characteristics.

20 Claims, 4 Drawing Sheets

POLISHING PAD FOR CHEMICAL-MECHANICAL POLISHING OF A SEMICONDUCTOR SUBSTRATE

This is a divisional of patent application Ser. No. 08/167,008, filed Dec. 16, 1993 now U.S. Pat. No. 5,441,598.

FIELD OF THE INVENTION

The present invention relates to the field of semiconductor devices, and in particular, to polishing pads used in chemical-mechanical polishing of semiconductor substrates.

BACKGROUND OF THE INVENTION

Planarization of semiconductor substrates is becoming more important as the number of layers used to form a semiconductor device increases. Nonplanar semiconductor substrates have many problems including difficulty in patterning a photoresist layer, formation of a void within a film during the film deposition, and incomplete removal of a layer during an etch process leaving residual portions of the layer, which are sometimes called "stringers." A number of planarization processes have been developed and include chemical-mechanical polishing.

Chemical-mechanical polishing may use a polyurethane polishing pad. In chemical-mechanical polishing, a substrate is pressed against a polishing pad that is wetted with a polishing slurry. FIG. 1 includes a cross-sectional view of a portion of a typical polishing pad surface 10. The pad surface 10 consists of many peaks or "asperities" that protrude from the polishing pad surface 14. An asperity 11 is characterized by a height 12 and a radius 13. The height 12 is the distance between the tip of a peak and the polishing pad surface 14. The radius 13 is the radius of curvature at the peak. Heights and radii of the asperities usually vary randomly. A typical commercially-available polishing pad has a standard deviation of heights of about 30 microns and an average radius of about 35 microns.

The random variation of the surface of a polishing pad is believed to be caused in part by the manner in which the polishing pads are formed. Typically, a cylinder of polyurethane is formed and is cut into slices to form a plurality of polishing pads. A cutting blade may snag on polyurethane filaments within the polishing pad causing the random variations of the topography of the polishing pad. This random variation in heights and radii of the asperities in typical polishing pads creates difficulties in substrate polishing.

FIG. 2 includes a cross sectional view of a portion of a semiconductor substrate 20 having a patterned layer 21 and a layer 22 overlying the patterned layer 21. The substrate 20 may include an insulating layer, a conductor, or the like. Each of the patterned layer 21 and layer 22 may be an insulating layer or a conductive layer, but patterned layer 21 and layer 22 are typically dissimilar materials. The layer 22 has a thickness at least as thick as the patterned layer 21, so that the openings within the patterned layer 21 are filled. In theory, the layer 22 is to be polished such that layer 22 only remains within the openings, and the combination of the patterned layer 21 and layer 22 forms a flat surface after polishing.

FIG. 3 shows how varying asperities may cause problems when layer 22 is polished with a polishing pad that includes asperities 31 and 32. The asperities 31 and 32 are located adjacent to each other on the same surface of a polishing pad. The patterned layer 21 has openings that are about the same dimensions. The asperity 31 has a radius that is larger than the openings. As a result, the asperity 31 does not significantly dig into the member 221, which is that portion of layer 22 lying within the left-hand opening. Unlike asperity 31, asperity 32 has a radius that is smaller than the openings. Unfortunately, asperity 32 can dig into member 222, which is that portion of layer 22 lying within the right-hand opening, and causes the well-known problem called "dishing" which is a condition where the thickness of member 222 is thinner near the center of the opening compared to the edge of the opening. Dishing is undesired.

Beyond the problem just described, the difference in heights and radii also cause variations in contact area. In other words, the local polishing rate for asperity 31 is different from the local polishing rate for asperity 32. Because of height and radius variations of the asperities, it is difficult to control the contact properties, such as contact pressure and contact area, between the asperities and portions of the patterned layer 21 or the layer 22. Therefore, random variation of asperity sizes may reduce the ability to selectively remove layer 22 uniformly across the substrate.

A perfectly flat sheet of polishing pad is not expected to solve the prior art problems. Even at relatively low platen and/or substrate rotational speeds, a thin film of slurry may form between the substrate and the polishing pad and cause hydroplaning. With hydroplaning, any polishing that may occur is primarily only chemical and not mechanical. This is not desired because the removal rate of the layer 22 declines. Also, the polishing is likely to become less preferential. In other words, the polishing may remove the higher portions of layer 22 at a rate that is closer to the rate that the lower portions of layer 22 are removed. Therefore, hydroplaning may cause a lower selectivity between the high portions and low portions of a layer to be polished which is undesired.

SUMMARY OF THE INVENTION

The present invention includes a polishing pad for chemical-mechanical polishing of a semiconductor substrate. The polishing pad has a polishing side for polishing the semiconductor substrate. The polishing side has a plurality of features each having a height. The standard deviation of the heights is less than 20 microns. The present invention also includes a polishing pad comprising a plurality of pores, wherein the average pore size no larger than 75 microns. The present invention further includes methods for using the polishing pads.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE EMBODIMENTS

Polishing pads may be formed by molds that determine the shape of features formed on sides of the polishing pads. The polishing pads are formed with more controlled shapes and sizes of features. The pads may also be formed to have pore sizes as small as one micron or even less. By controlling the shape of the polishing pad, more control over local polishing characteristics should result. The invention is better understood by the description of embodiments that appear below.

Molded Polishing Pad

Figure 1:
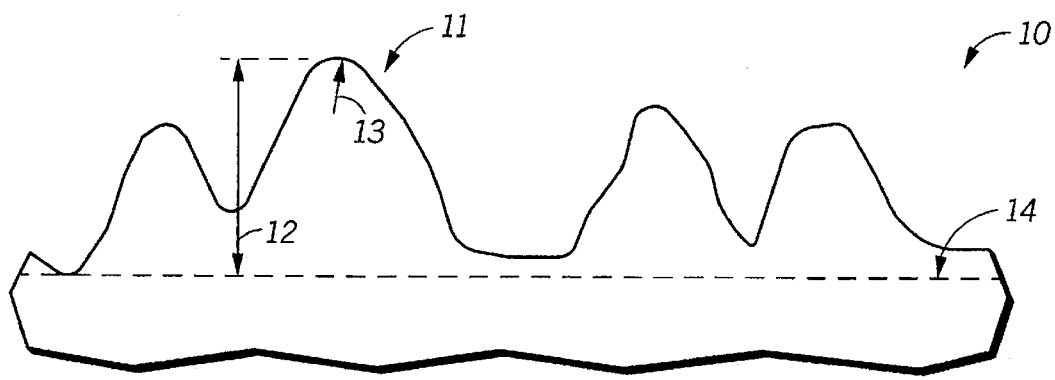
FIG. 1 includes a cross-sectional view of a portion of a polishing pad surface. (Prior art)
Figure 2:
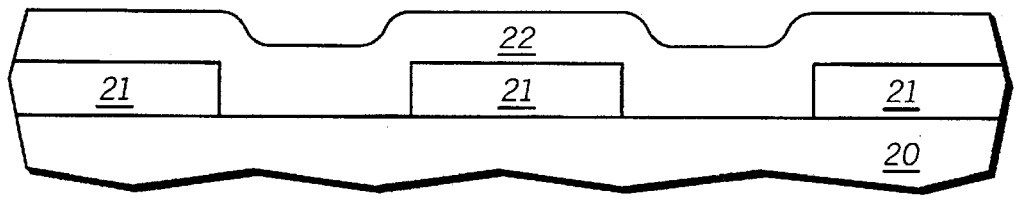
FIG. 2 includes a cross-sectional view of a portion of a semiconductor substrate with a patterned layer and a layer overlying the patterned layer. (Prior art)
Figure 3:
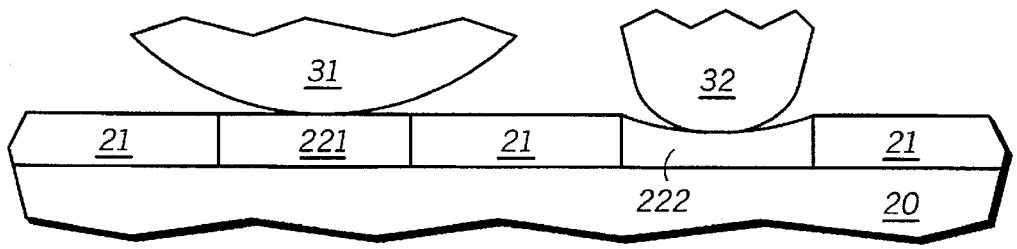
FIG. 3 includes a cross-sectional view of portions of asperities and a portion of the semiconductor substrate of FIG. 2 illustrating the asperities during polishing. (Prior art)
Figure 4:
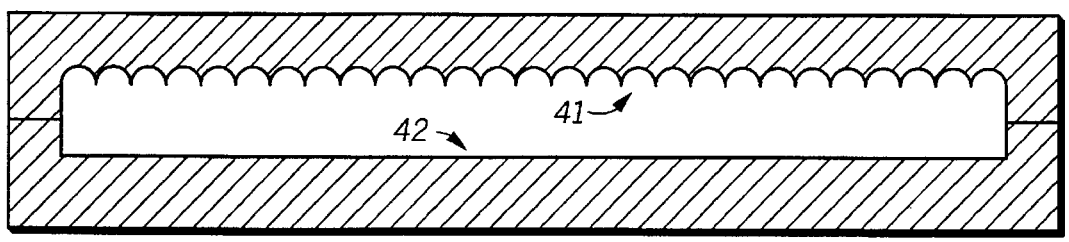
FIG. 4 includes a cross-sectional view of a mold used to form polishing pads.

In one embodiment, a mold is used to form polishing pads. FIG. 4 includes a cross-sectional view of a mold 40 having a first primary surface 41 and a second primary surface 42. Patterns can be inscribed or etched to form the primary surfaces 41 and 42 because the mold 40 can be made from glass or a metal, such as stainless steel. The surface roughness of the primary surfaces 41 and 42 can be polished to less than 0.1 micron. In this embodiment, the first primary surface 41 has a pattern that determines the topography of a polishing side of a polishing pad, and the second primarily surface 42 is relatively flat. The distance between the primary surfaces corresponds to the desired thickness of the polishing pad that is usually no more than 5 millimeters thick and is typically about 1–2 millimeters thick.

The chemicals that form a polyurethane polishing pad are introduced into the mold 40. The reaction to form polyurethane is an "expanding" type of reaction meaning that the final volume of the polyurethane is greater than the volume of the chemicals used to form polyurethane. During the reaction, polyurethane is formed and fills the mold, so that the topography of the polyurethane is determined by the primary surfaces 41 and 42 of the mold 40. The mold 40 may be provided with a spout (not shown) through which excess polyurethane may flow if too much of the chemicals is used. The primary surface 41 should be down when the chemicals are introduced just in case the mold does not completely fill during the polyurethane reaction.

Figure 5:
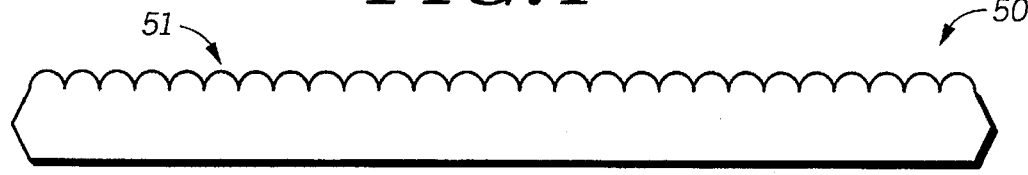
FIG. 5 includes a cross-sectional view of a polishing pad formed by the mold of FIG. 4.

After the reaction is complete, a sheet of polyurethane is removed from the mold 40. The sheet is cut to form a polishing pad 50 that includes a polishing side 51 and a backing side 52 as shown in FIG. 5. The polishing side 51 has a topography that is virtually an inverse image of the first primary surface 41, and the backing side 52 is relatively flat similar to the second primary surface 42. The polishing side 51 comes in contact with substrates during polishing, and the backing side 52 is attached to a platen of a polishing machine. The polishing side 51 has a topography that is well controlled because the surface of the mold can be well controlled. Note that the edges of the polishing pad are formed when the sheet is cut into polishing pads. The edges of the polishing pad do not normally come in contact with a substrate during polishing. Unlike the conventional pads, the topography of the polishing side 51 is determined by the mold 40 and is not formed by cutting a slice from a cylinder of polyurethane. Therefore, the polishing side 51 where polishing occurs is not distorted by the cutting of the sheet into individual polishing pads.

Figure 6:
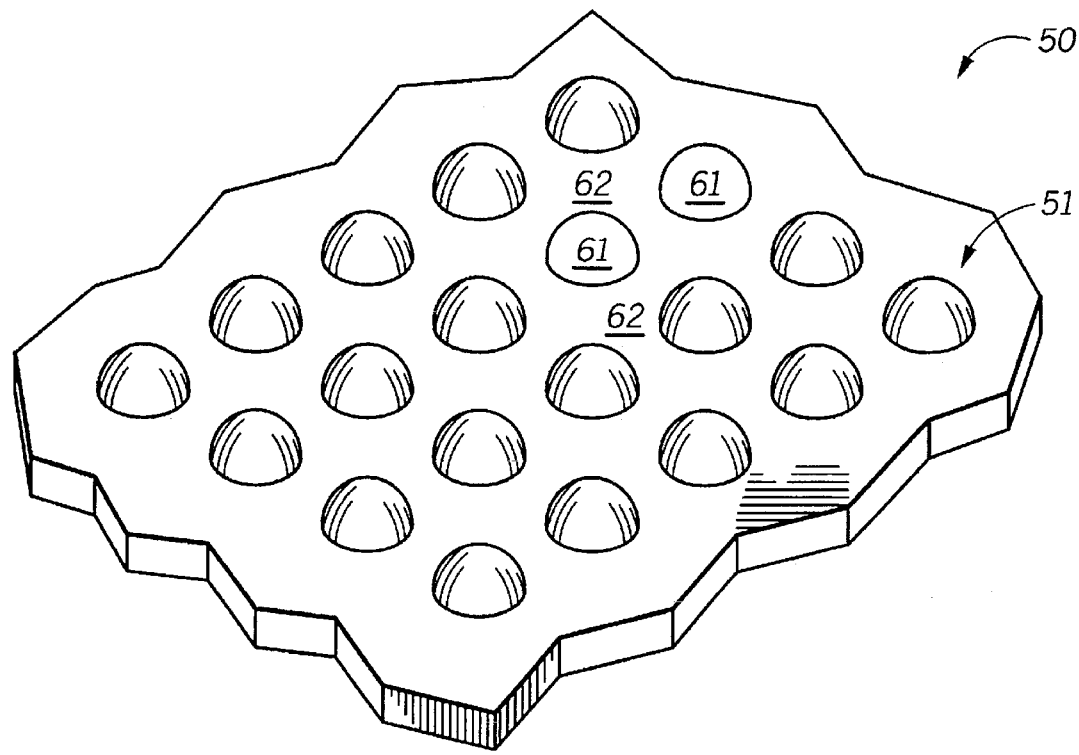
FIG. 6 includes a perspective view of an enlarged portion of the polishing side of the polishing pad of FIG. 5.

FIG. 6 includes a perspective and enlarged view of a portion of the polishing side 51 of the polishing pad 50. The polishing side 51 includes a plurality of hemispheres 61 that act as asperities and are separated from one another by channels 62 that help to transport polishing slurry and remove polishing products. Each of the hemispheres 61 has a radius of about 100–1000 microns and usually is between about 200–500 microns. In general, all of the radii of the hemispheres should be about the same. The heights of the hemispheres 61 are the same as their radii. The standard deviation of those heights should be less than 20 microns, and typically is less than 1 micron. The standard deviation in the heights may be as small as the surface roughness of the first primary surface 41 which may be as small as 0.1 micron. The hemispheres 61 are contiguous with the underlying portion of the polishing pad 50. The channels are between about 0.1–5.0 millimeters wide at the base of the hemispheres 61. Therefore, the distance between hemispheres 61 is about 0.1–5.0 millimeters. The depth of the channels corresponds to the radii of the hemispheres and is between about 0.1–1.0 millimeters.

The channels 62 allow the polishing slurry near the hemispheres 61 to flow without causing hydroplaning. Also, the channels theoretically allow using a polishing pad without pores. Conventional polishing pads virtually must have pores to allow the polishing slurry to flow to the polishing side of the polishing pad, and those pores have an average pore size between about 100–200 microns. Because the channels aid slurry transport, a smaller pore size may be used. The average pore size may be less than 75 microns and may even be lower than about 10 microns. A lower limit on average pore size is not known, but a smaller pore size should increase the local polishing rate because more of the polishing pad may be in contact with the substrate or a layer overlying the substrate at any point in time during polishing.

Other Patterns

Figure 7:
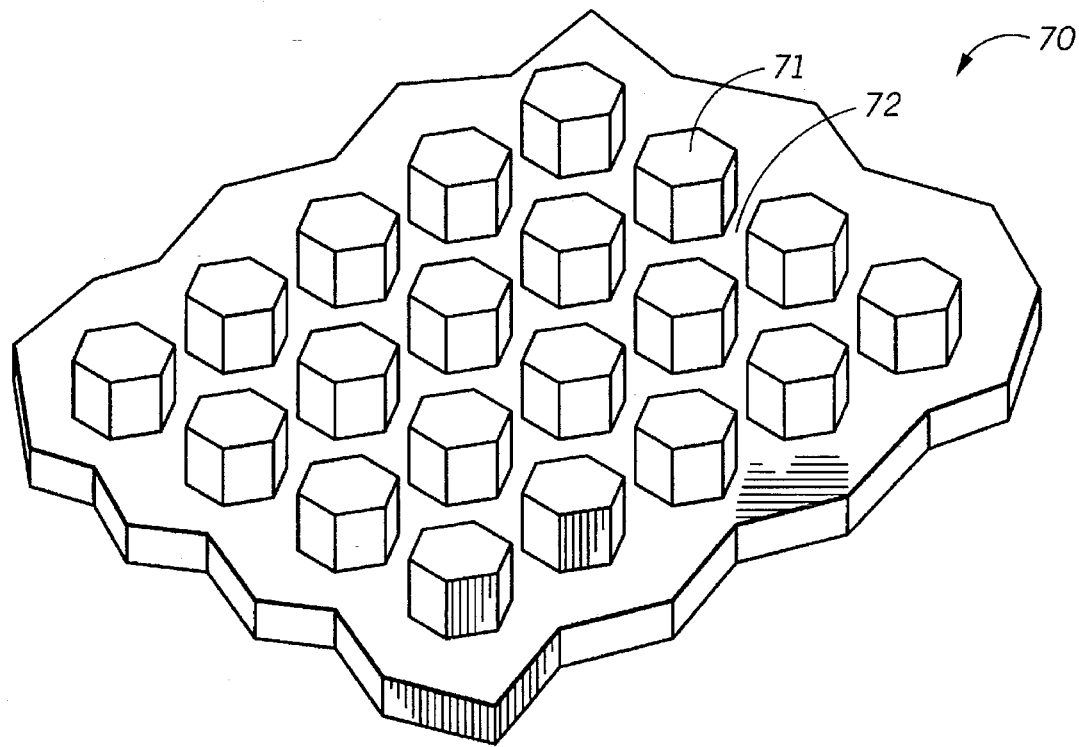
FIG. 7 includes a perspective view of a portion of a polishing side of a polishing pad having hexagonal-like shaped features.

In other embodiments, many other types of features may be made and used. The features act as asperities. In addition to hemispheres, the feature shapes may include cubes, cylinders, and many other shapes. As used in this specification, a feature is a protrusion at the polishing side of the polishing pad and extends from the body of the polishing pad. The features are typically contiguous with the polishing pad. FIG. 7 includes a perspective view of a polishing pad 70 having hexagon-like shaped features 71. The tops of the hexagons actually come in contact with a substrate during polishing and form the polishing area. The polishing area of each feature is about 0.03–12 square millimeters and typically is less than one square millimeter. The standard deviation in heights of the features for the polishing pad 70 should be about the same as the polishing pad 50. The channels 72 that lies between structures 71 are about 0.1–5.0 millimeters wide. The depth of the channels 72 corresponds to the heights of the features that are about 100–1000 microns and typically are about 250–500 microns.

Figure 8:
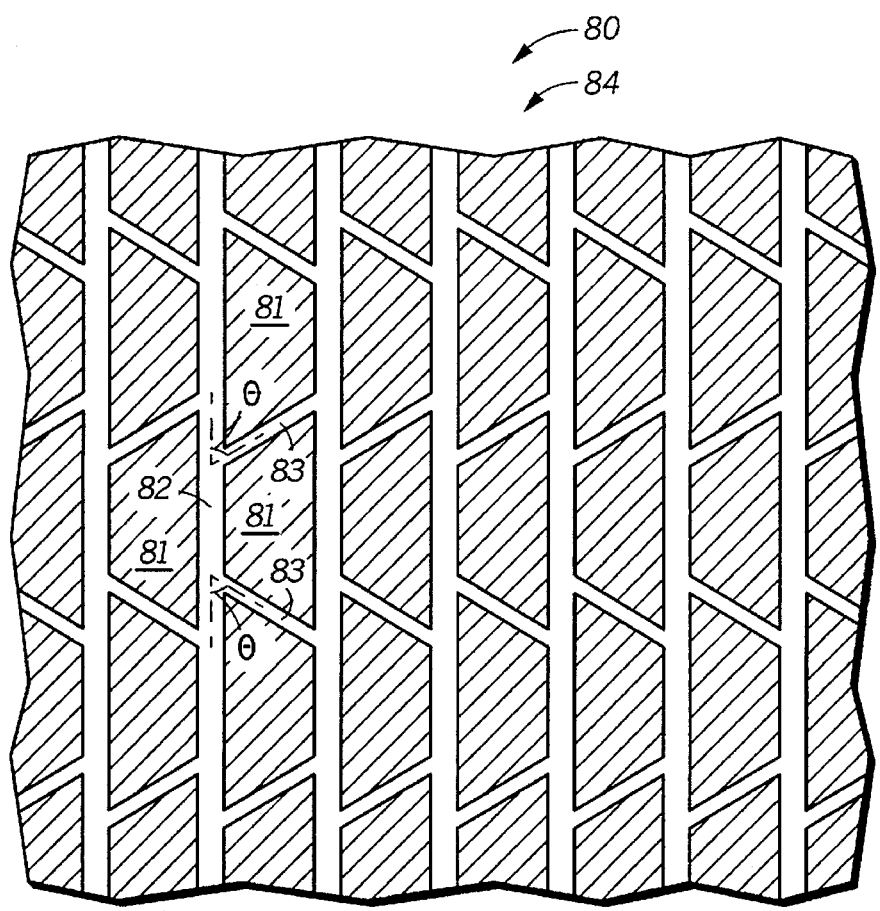
FIG. 8 includes a top view of a portion of a polishing side of a polishing pad having trapezoidal-like shaped features configured into a tread pattern.

In another embodiment, the features may be formed to look like a tread pattern. Referring to FIG. 8, the polishing surface 84 of the polishing pad 80 includes trapezoidal-like shaped features 81 and is configured in such a manner to form a tread pattern. Two types of channels are formed between the features. The main channels 82 have lengths that are generally are parallel to one another and generally oriented from top to bottom as shown in FIG. 8. The bias channels 83 intersect the main channels 82 and have lengths that are generally oriented at an acute angle θ that is between about 20–70 degrees from the length of the main channels, hence the term "bias." In any event, the bias channels 83 are not perpendicular to the main channels 82. The polishing pad 80 is formed using a mold similar to polishing pad 50. The first primary surface of the mold is different to reflect the polishing side 81 of the polishing pad 80. The formation of the polishing pad 80 is similar to the formation of the polishing pad 50.

The main channels 82 have dimensions similar to the channels 62 and 72. The main channels 82 are usually about 1.25 to 5 times wider than the width of the bias channels 83. Usually the bias channels 83 and main channels 82 have about the same depth, but in other embodiments, the bias channels 83 may be shallower than the main channels 82. The polishing area and standard deviations of heights of the features for polishing pad 80 are similar to polishing pad 70.

Figure 10:
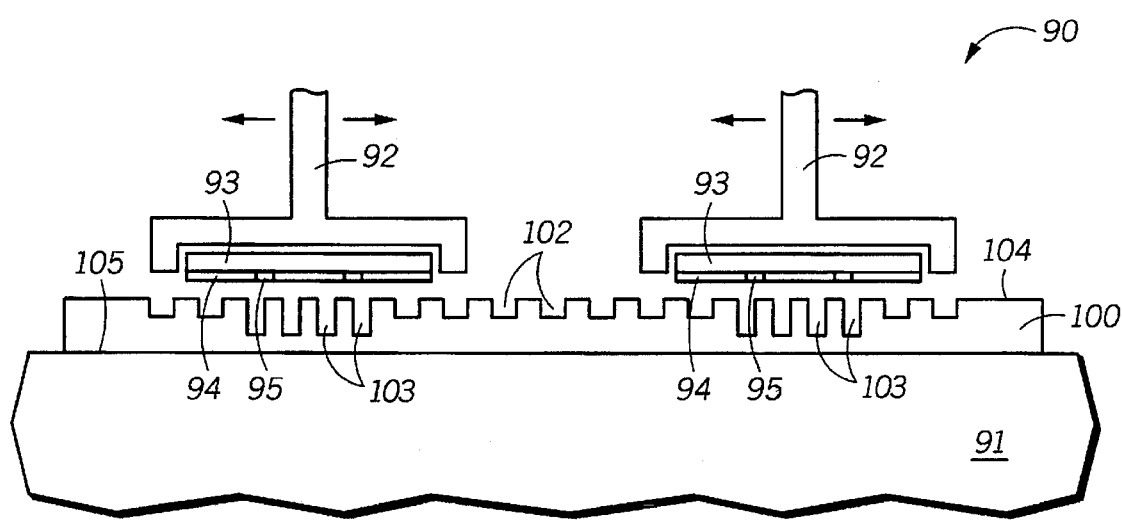
FIG. 10 includes a cross-sectional view of a portion of a polisher include substrates and a polishing pad.

FIG. 10 includes a polishing pad 100 having varying depths of the channels and the spacing between the channels. The polishing pad 100 is described in more detail below.

Polishing with the Polishing Pads

Below is a discussion of the polishing performed with the polishing pad 80. One skilled in the art appreciates that the use of polishing pads 50 and 70 may have similar concerns.

Figure 9:
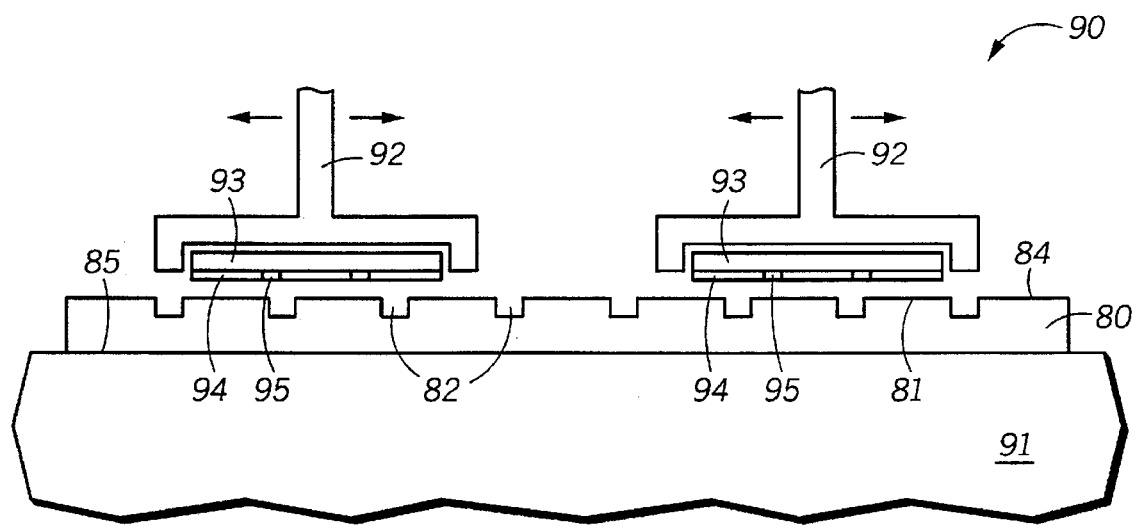
FIG. 9 includes a cross-sectional view of a portion of a polisher include substrates and the polishing pad of FIG. 8.

Referring to FIG. 9, the backing side 85 of the polishing pad 80 is attached to a platen 91 of a polisher 90. The polisher 90 further includes substrate holders 92 that hold the substrates 93 having a patterned layer 94 and a layer 95 to be polished. Before polishing, the combination of substrate 93, patterned layer 94, and layer 95 is similar to the combination of substrate 20, patterned layer 21, and layer 22. Layer 95 is to be polished such that layer 94 only lies within openings of patterned layer 94. Obviously, dishing is to be avoided. Therefore, patterned layer 94 and layer 95 are to form a substantially flat surface when polishing is completed. The patterned layer 94 and the layer 95 each include any one or more of the following materials: silicon (polycrystalline silicon, amorphous silicon, epitaxial silicon, or the like), an insulating material (silicon dioxide, silicon nitride, or the like), or a metal-containing material (aluminum, copper, tungsten, titanium, tantalum, silicides, or the like). The patterned layer 94 and the layer 95 include at least one dissimilar material. For simplicity, the semiconductor substrates and any layers overlying the substrates are hereinafter referred to as "substrates 93."

Just before the actual polishing begins, a thin film of a polishing slurry (not shown) lies on the polishing pad 80. The polishing slurry typically contains chemicals and abrasive particles. The actual selection of chemicals depends on the material to be polished (layer 95), but those skilled in the art are capable of selecting chemicals for the polishing slurry. The slurry has about 3–7 weight percent abrasive particles (silica, alumina, or the like), and the slurry flow rate is about 30–60 milliliters per minute. The substrates 93 are held above the polishing pad 80.

During polishing, the platen 91 and/or substrates 93 are rotated. Also, substrate holders 92 oscillate back and forth in a lateral direction and are generally shown by arrows in FIG. 9. The substrate holders 92 press layer 95 against the polishing side 81 of the polishing pad 80. The combination of the chemicals, abrasive particles, and contact with the polishing pad polish the layer 95. The polishing using polishing pad 80 is more selective than polishing with a conventional pad. Selectivity is the measure of the polishing rate at higher points compared to the polishing rates of the lower points along the same layer of the substrate. The improved selectivity is related to the control over the standard deviation of heights and also the use of channels. The polishing is performed until layer 95 lies only within the openings of patterned layer 94.

High rotational speeds (platen or substrate) may be used if the channels are modified. The design of the main and bias channels 82 and 83 are designed to reduce the likelihood of hydroplaning. The channels 82 or 83 may need to be wider or deeper at the high rotational speeds. Also, θ may need to be reduced to 10 degrees or even less. The wider or deeper channels or the lower θ help to increase the flow rate of polishing slurry and polishing products to reduce the likelihood of forming a thin film between the polishing area of the features 81 and the layer 95. Those skilled in the art should be capable of determining the dimensions of the channels and/or θ to reduce the likelihood of hydroplaning.

FIG. 10 includes a polishing pad 100 having a polishing side 104 and a backing side 105. To make the polishing rate more uniform, two types of channels are used. Channels 103 are deeper and spaced closer together compared to channels 102. The channels 103 are located on the polishing pad within the central polishing region of the pad 100, wherein the central polishing region is that portion of the polishing pad 100 that underlies the center point of the substrates 93 at any time during polishing. The channels 103 help to increase slurry transport and polishing product removal. Therefore, polishing pad 100 may be designed to have a more uniform polishing rate.

One skilled in the art understands that the figures and particularly FIGS. 9 and 10 are not drawn to scale. The figures are illustrative and show various aspects of the embodiments described.

Benefits and Options

Polishing with the polishing pads described above should have better polishing characteristics. The mold allows the surface to be well controlled. The features are formed such that the they should be less likely to cause dishing. Also, the channels help to reduce the likelihood of hydroplaning. The patterns are formed such that excess polishing slurry between the pad and substrate surfaces can be drained away and slurry pressure will not build up between the pad and the substrate. Because the polishing side of the polishing pad is determined by the mold, the polishing pad does not require conditioning prior to polishing substrates. Further, because a smaller pore size may be used, the amount of polishing pad contacting the exposed surface of the substrate at any point in time during polishing may be larger than with conventional polishing pads. Conventional polishing pads are typically used with a polishing slurry having about 10 weight percent abrasive particles, and a slurry flow rate of about 100 milliliters per minute. The lower abrasive particles concentration and lower slurry flow rate should help to increase the lifetime of a pump that delivers the polishing slurry to the polishing pad.

Other polishing characteristics are improved with the polishing pad. Because the shapes of the features are controlled in the pad formation step, microscopic contact pressure and contact area between the features and the layer to be polished on the substrate can be better controlled during the polishing. The features should only contact the high points along a surface of a layer to be polished, and polishing selectivity is increased.

Many options exist for the formation of the polishing pads. In an alternate embodiment, polishing pads may be formed individually by each mold. In addition, the mold may be "customized" for an application. Typically, the polishing rate near the center of a surface of the substrate is lower than near the outer edge because of a lower relative velocity between the center and the polishing pad compared to the outer edge of the layer and the polishing pad. The polishing pads may be formed to compensate so that the polishing rate may be more uniform. FIG. 10 previously described is an example. Another example may include a thicker pad where the center of the substrate passes over the polishing pad. The thicker pad will have a locally higher polishing pressure causing a locally higher polishing rate.

In another embodiment, an "open-ended" mold may be used. An open-ended mold would have first primary surface and the sides similar to mold 40, but does not have second primary surface. Reactants are placed in the mold and allowed to react to form a polyurethane polishing pad. If the polishing pad is too thick or nonuniform in thickness, the polishing pad may be cut on the backing side of the polishing pad to get the polishing pad to the desired thickness.

In the foregoing specification, the invention has been described with reference to specific embodiments thereof. However, it will be evident that various modifications and changes can be made thereto without departing from the broader spirit or scope of the invention as set forth in the appended claims. Accordingly, the specification and drawings are to be regarded in an illustrative rather than a restrictive sense.

What is claimed is:

1. A polishing pad for chemical-mechanical polishing of a semiconductor substrate, wherein:

the polishing pad has a polishing side for polishing the semiconductor substrate;

the polishing side has a plurality of features that each have a height; and a standard deviation of the heights is less than 20 microns.

2. The polishing pad of claim 1, further comprising a plurality of pores having an average pore size no larger than 75 microns.

3. The polishing pad of claim 1, further comprising first channels and second channels lying between at least some of the plurality of features, wherein:

the first channels overlie a first region of the polishing pad;

each of the first channels has a first depth;

the first channels are spaced apart from each other by a first spacing;

the second channels overlie a second region of the polishing pad;

each of the second channels has a second depth;

the second channels are spaced apart from each other by a second spacing;

the first depth is deeper than the second depth; and the first spacing is narrower than the second spacing.

4. The polishing pad of claim 1, further comprising a first channel and a second channel, wherein:

the second channel intersects the first channel at an acute angle; and the acute angle is no greater than 70 degrees.

5. The polishing pad of claim 1, wherein each feature has a shape selected from a group consisting of hemispherical, cubical, cylindrical, rectangular-like, hexagonal-like, and trapezoidal-like.

6. The polishing pad of claim 1, wherein the polishing pad does not have any pores.

7. The polishing pad of claim 1, wherein the polishing pad further comprises a first channel, second channels, and a third channel wherein:

the first and third channels lie on opposite sides of one of the features and are parallel to each other;

each of the second channels within a first set of the second channels intersects the first channel;

each of the second channels within a second set of the second channels intersects the third channel;

each of the second channels has a length;

no two lengths of the second channels within the first set of the second channels lie along a same line; and no two lengths of the second channels within the second set of the second channels lie along a same line.

8. A polishing pad for chemical-mechanical polishing of a semiconductor substrate comprising a plurality of pores, wherein an average pore size is smaller than 10 microns.

9. The polishing pad of claim 8, further comprising:

a polishing side for polishing the semiconductor substrate; and a plurality of features located along the polishing side, wherein:

each of the features has a height; and a standard deviation of the heights is less than 20 microns.

10. The polishing pad of claim 9, further comprising a first channel lying between two of the plurality of features, wherein the first channel:

has a width between about 0.1–5.0 millimeters; and has a depth between about 0.1–1.0 millimeter.

11. The polishing pad of claim 9, further comprising a first channel and a second channel, wherein:

the second channel intersects the first channel at an acute angle; and the acute angle is no greater than 70 degrees.

12. The polishing pad of claim 9, wherein each of the features has a shape selected from a group consisting of hemispherical, cubical, cylindrical, rectangular-like, hexagonal-like, and trapezoidal-like.

13. A polishing pad for chemical-mechanical polishing of a semiconductor substrate comprising:

a first channel; and a second channel, wherein the second channel intersects the first channel at an acute angle that is no greater than 70 degrees.

14. The polishing pad of claim 13, wherein the first channel has:

a width between about 0.1–5.0 millimeters; and a depth between about 0.1–1.0 millimeter.

15. The polishing pad of claim 13, wherein the polishing pad further comprises a plurality of pores having an average pore size no larger than 75 microns.

16. The polishing pad of claim 13, wherein the polishing pad does not have any pores.

17. The polishing pad of claim 13, further comprising a plurality of features located along a polishing side of the polishing pad, wherein:

each of the features has a height; and a standard deviation of the heights is less than 20 microns.

18. The polishing pad of claim 17, wherein each feature has a shape selected from a group consisting of hemispherical, cylindrical, hexagonal-like, and trapezoidal-like.

19. The polishing pad of claim 13, wherein the polishing pad further comprises additional second channels, wherein:

each of the second channels intersects the first channel;

each of the second channel has a length; and no two lengths of the second channels lie along a same line.

20. The process of claim 13, wherein the polishing pad further comprises additional second channels and a third channel wherein:

the first and third channels are parallel to each other;

each of the second channels within a first set of the second channels intersects the first channel;

each of the second channels within a second set of the second channels intersects the third channel;

each of the second channels has a length;

no two lengths of the second channels within the first set of the second channels lie along a same line; and no two lengths of the second channels within the second set of the second channels lie along a same line.

* * * * *